United States Patent [19]
Kaiser et al.

[11] 3,811,556
[45] May 21, 1974

[54] CONVEYOR APPARATUS, ESPECIALLY FOR SECTIONAL STEEL

[75] Inventors: Gerhard Kaiser, Metzingen; Gerhard Faiss, Reutlingen, both of Germany

[73] Assignee: Gustav Wagner Maschinenfabrik, Reutlingen, Germany

[22] Filed: Aug. 2, 1972

[21] Appl. No.: 277,297

[30] Foreign Application Priority Data
Dec. 16, 1971 Germany............................ 2162605

[52] U.S. Cl..................... 198/204, 193/38, 198/173
[51] Int. Cl............................................. B65g 15/60
[58] Field of Search ........... 198/103, 127, 172, 173, 198/204, 212; 193/38

[56] References Cited
UNITED STATES PATENTS
3,446,326  5/1969  Sandefur.............................. 193/38
2,608,288  8/1952  Talbot................................. 198/173
3,237,756  3/1966  Pulver................................. 198/195
1,647,665  11/1927  Riche................................... 193/38
2,724,486  11/1955  Hatch et al.......................... 198/103 X
3,612,253  10/1971  Hoffman et al...................... 198/173

Primary Examiner—Evon C. Blunk
Assistant Examiner—Bruce H. Stoner, Jr.
Attorney, Agent, or Firm—W. G. Fasse

[57] ABSTRACT

The present conveyor apparatus is adapted for moving sectional steel to machining stations whereby the sectional steel is carried by means of roller chains across steel rails of a cross conveyor to main conveyor means. For avoiding a screeching noise, bars of synthetic material are arranged alongside at least one side of said steel rails to reach slightly above the top surface of the steel rails whereby the sectional steel may slide along said bars of synthetic material. Preferably, the synthetic material bars are adjustable in their elevational position relative to the respective rail to compensate for wear and tear.

8 Claims, 4 Drawing Figures

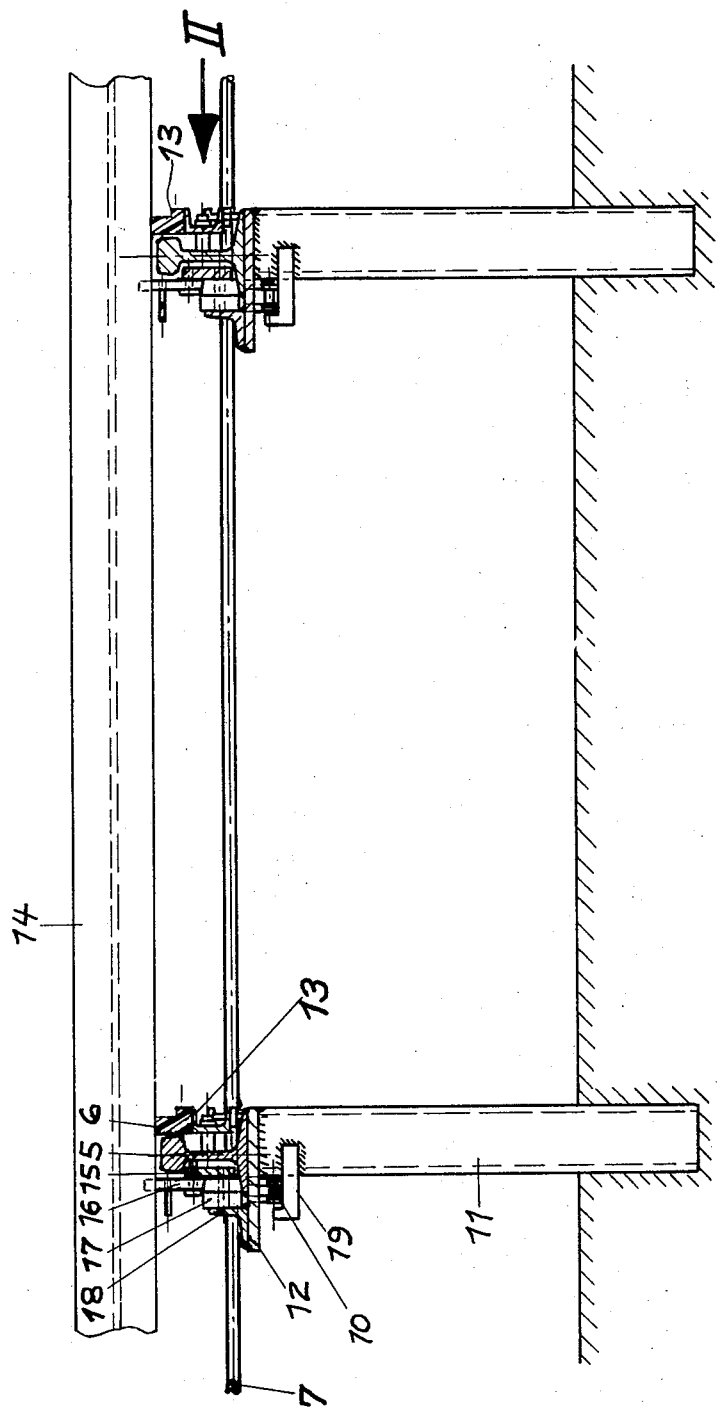

3,811,556

CONVEYOR APPARATUS, ESPECIALLY FOR SECTIONAL STEEL

BACKGROUND OF THE INVENTION

The present invention relates to a conveyor apparatus, especially for sectional steel. Such conveyor apparatus is usually combined with machining equipment for sectional structural steel beams. The machining equipment comprises, for example, a saw in which the sectional steel is cut into pieces of predetermined length. Additionally or in the alternative, the equipment may comprise a drill press for drilling holes into the sectional steel in accordance with given templates for connecting the sectional steel, for example, by means of lashing elements.

It is known to feed the sectional steel into the machining equipment by means of roller conveyors comprising driven rollers. It is also known to remove the sectional steel from the machining equipment by similar driven roller conveyors. It is further known to arrange laterally adjacent to such roller infeed conveyors as well as laterally adjacent to said roller removal conveyors so called cross transport means which facilitate the depositing of the raw sectional steel pieces on the infeed roller conveyor as well as the removal of the finished steel sections from the output roller conveyor by obviating the continuous substantially intermittent need for the operation of a large overhead crane.

These prior art, so-called cross transport means comprise a plurality of long rails arranged in parallel to each other and at a right angle relative to the transport direction of the roller conveyor means. These rails may have the shape of sectional steel having any desired cross-section preferably the cross section of railroad rails which are connected to steel support members anchored or cemented into a foundation, whereby the rails are connected to the support members, for example, by weldments or by means of nuts and bolts.

An advantage of these cross transport means resides in the fact that a large quantity of raw profile sectional steel members may be deposited on the cross transport means at the input side of the conveyor means, whereby the overhead crane may be used for other work while the sectional steel members are being machined.

Usually the parallel rails of the cross transport means have shorter spacings among each other in the immediate vicinity of the machining apparatus, whereby shorter sectional steel members may be placed in readiness. Simultaneously, the spacings between the parallel rails increase as the distance from the machining apparatus increases, whereby the cross transport means are capable of receiving longer sectional steel members.

Adjacent to each rail of the cross transport means there is arranged a drag chain for transporting the sectional steel members. The drag chain may preferably be supported by a drag carriage which may run along the footing of the respective rail and the chain is provided with rocker cams on which the sectional steel members are supported. The drag carriage or carriages are moved back and forth by means of roller chains, all of which run over sprocket wheel which are secured to common drive shafts extending across the entire width of the cross transport means.

Since the rocker cams are attached to the chains, the rocker cams may be moved underneath a sectional steel member, whereby the latter may be placed on top of the respective rocker cams. The drag carriages of the cross transport means are movable into the space underneath the roller conveyor for transferring a sectional steel member from the cross transport means onto such roller conveyor and through the roller conveyor into the machining station. If the carriage is stopped underneath of a resting sectional steel member or between two sectional steel members, the rocker cam takes up again an upright position and the sectional steel member or members may be pulled onto the roller conveyor means.

The just described prior art apparatus has the advantages that the advancing of the sectional steel members along the rails of the cross transport means creates a deafening shrieking noise, especially when small and light sectional steel members are dragged across these rails. This is especially disadvantageous because many workshops having such transport means are located within or close to residential areas, whereby the environment of these areas is adversely affected.

It has been suggested heretofore to eliminate or reduce such shrieking noise by greasing the rails of the cross transport means. This resulted in a substantial elimination of the noise. However, the greasing has the disadvantage that the transported sectional steel members also became greased which required a subsequent degreasing, for example, in a leaching solution, because without such degreasing, the sectional steel members cannot be painted.

Another solution of the above problem has tried to avoid the rails in the cross transport means altogether and to employ instead of the drag chains heavy roller chains onto which the sectional steel members are placed directly and which move or transport the sectional steel members directly onto the roller conveyor. Lifting lever systems have also been used in a known manner heretofore. Roller chains, as well as lifting lever systems naturally avoid the shrieking noise. However, with these devices, it is necessary to space the sectional steel members from each other at least to an extent corresponding to one-half of the width of the roller conveyor because otherwise it is not possible to place a single sectional steel member onto the roller conveyor. In other words, in these prior art devices the cross transport means cannot be loaded as densely as would be desirable from an economical point of view. Hence, these devices are rather uneconomical in their operation.

OBJECTS OF THE INVENTION

In view of the foregoing, it is the aim of the invention to achieve the following objects singly or in combination:

to avoid the drawbacks of the prior art, especially to employ a cross transport system with drag carriages and rocker cams, while simultaneously avoiding a shrieking noise as the sectional steel members slide along the cross transport means;

to assure that the cross transport means may be loaded in an economical manner while simultaneously permitting the loading of one sectional steel member at a time onto the roller conveyor which moves the sectional steel member into a machining station;

to provide means for avoiding the above described shrieking noise which will eliminate the direct contact between the rails of the cross transport means and the sectional steel members;

to provide contact avoiding means which are adjustable in their elevational position so that these contact avoiding means may be repositioned in response to wear and tear; and to employ synthetic material contact avoiding means which will also avoid the need for greasing the cross transport rails.

SUMMARY OF THE INVENTION

According to the invention there is provided a conveyor apparatus, especially for sectional steel comprising main rails preferably railroad rails to which are attached on their free sides, that is, the side opposite the drag carriage a sectional bar or member preferably a U-channel member by means of screws in such a manner that the free legs extend horizontally and so that the open channel faces away from the railroad rail. Moldings or bars of synthetic material are releasably attached to the upper surface of the upper free leg of the U-channel. Preferably, the bars or strips of synthetic material are made of material such as a polyamide. The releasable connection is accomplished for example by means of little steel blocks which are welded to the upper surface of the upper U-channel leg. Preferably, the little steel blocks are spaced at even intervals along the length of the U-channel and the synthetic material bars are screwed to these steel blocks. The bars of synthetic material are positioned in such a manner that they extend somewhat above the upper surface of the main rail of the cross transport means. It has been found that a height of about 5 millimeters extending above the upper surface of the main rails is sufficient to enable the synthetic material bar to function as the transport surface or path. Durability tests have shown that the shrieking noise encountered heretofore has been removed completely by the teachings of the present invention. It has further been found that the wear and tear of the synthetic material bars is surprisingly small.

According to the invention, the U-channel members are provided with longitudinal apertures in their vertically extending lands interconnecting the upper and lower legs. Preferably, the longitudinal apertures are spaced from each other at equal intervals. The U-channels are connected through these apertures to the main rails whereby spacer bushings are arranged between the rail and the rail facing surface of the land of the U-channel. These longitudinal apertures extend preferably vertically to permit an elevational adjustment of the U-channel member whereby the position of the synthetic material bar may be adjusted relative to the top surface of the rail, for example, subsequent to wear and tear of the synthetic material.

According to a further feature of the invention, the lower horizontally extending leg of the U-channel member is provided with threaded holes through which threaded bolts extend for assuring a uniform adjustment along the entire length of the U-channel members. The further threaded bolts extend downwardly to rest on the footing portion of the respective rail and a counter nut holds the respective threaded bolt in the desired position. These threaded bolts extend vertically and effectively support the respective U-channel member, whereby the load placed on the synthetic material bars by the sectional steel member is taken up by or transmitted through the threaded bolts to the respective rail.

The arrangement according to the invention that the synthetic material bars are adjustable has the further advantage that a sectional steel member which may have fallen down from a stack onto the synthetic material bars can compress the portion of the synthetic material which it hits only to the extent permitted by the adjacent main rail. In other words, the falling sectional member will be stopped by the main rail.

Another advantage of the invention is seen in that the synthetic material bars, which after prolonged wear and tear may have been worn out completely, can be easily and quickly replaced by new bars.

Still another advantage of the invention is seen in that its teachings may be applied not only to new conveyor devices but the present arrangement may also be easily installed in presently existing conveyor means, because such subsequent installing requires merely the drilling of threaded holes into the vertical portion of the main rails for receiving the horizontally extending connecting screws by means of which the U-channel member is connected to the main rail. It would even be possible to simply drill holes without threading and to use nuts and bolts for the just mentioned connection.

BRIEF FIGURE DESCRIPTION

In order that the invention may be clearly understood, it will now be described, by way of example, with reference to the accompanying drawings, wherein:

FIG. 2 is a sectional view along the line I—I in FIG. 1 and showing a sectional steel member;

DETAILED DESCRIPTION OF EXAMPLE EMBODIMENTS

Figure 1:
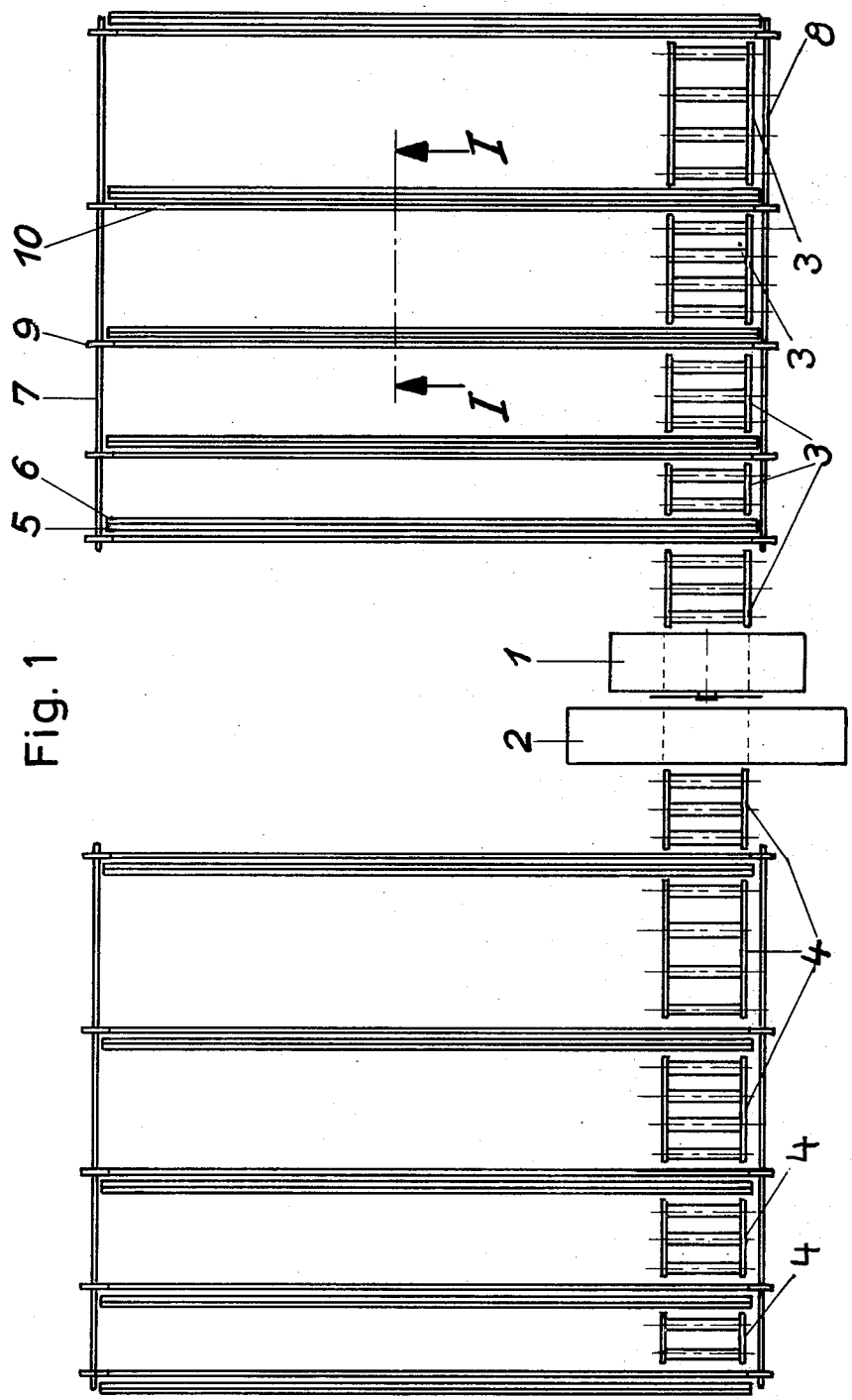
FIG. 1 illustrates a top plan view of a complete transport apparatus according to the invention, whereby the sectional steel members have been omitted.

FIG. 1 illustrates a top plan view of a conveyor apparatus according to the invention as it is used in conjunction with a machining station comprising, for example, a vertical saw 1 and a drill press 2, both the saw and the drill press are shown symbolically. To the right of the saw 1 there are shown infeed roller conveyors 3 by means of which sectional steel members are advanced into the drilling position. To the left of the drill press 2 there are arranged roller conveyors 4 for the removal of the finished sectional steel member from the machining station.

The roller conveyors 3 and 4 comprise sections which are spaced from each other in order to provide room for so called cross transport means to be described in more detail below. The cross transport means reach into the spacings between the roller conveyor sections but the top level of the cross transport means remains below the elevational level of the top run of the roller conveyor sections 3 and 4.

The cross transport means comprise main rails 5, for example, railroad rails. Alongside of one side of the rails 5 there are arranged as taught by this invention bars 6 of synthetic material, for example, of a polyamide. Alongside the opposite side of the rail 5 there are arranged transport roller chains 10 which run over chain or sprocket wheels 9 driven by common drive shafts 7 and 8 extending along the ends of the cross transport apparatus. The roller chains 10 operate as so called drag chains which take along so called drag carriages with rocker cams. The latter are not shown in FIG. 1 due to the small scale of FIG. 1.

FIG. 2 illustrates that the rails 5 are supported on top of upright posts 11 to the top end of which there are welded horizontal plates 12 which in turn carry the rails 5 and the U-channel members 13 which are connected to the rails 5 as will be described in more detail with reference to FIG. 4. The U-channels 13 carry the bars 6 of synthetic material in such an elevational position that the top surface of the bars 6 extends slightly above the top surface of the adjacent rail 5 so that the sectional steel member 14 may rest on the bar 6 and will be kept out of contact with the rail 5, whereby the screeching noise is avoided.

To the lefthand of each rail 5 there are arranged the above mentioned drag carriages 15 including rocker cams 16 and two runners or rollers 17 made of synthetic material. The drag carriages 15 are guided by guide rails 18 also welded to the top plate 12 whereby a lateral tilting of the drag carriages is prevented. The drag chains 10 are secured to the front and rear end of the drag carriages 15. However, this is not shown in FIG. 2 since it is conventional. Below the top plate 12 there are arms 19 welded to the upright posts 11 for supporting the lower or return run of the drag chains 10.

Figure 4:
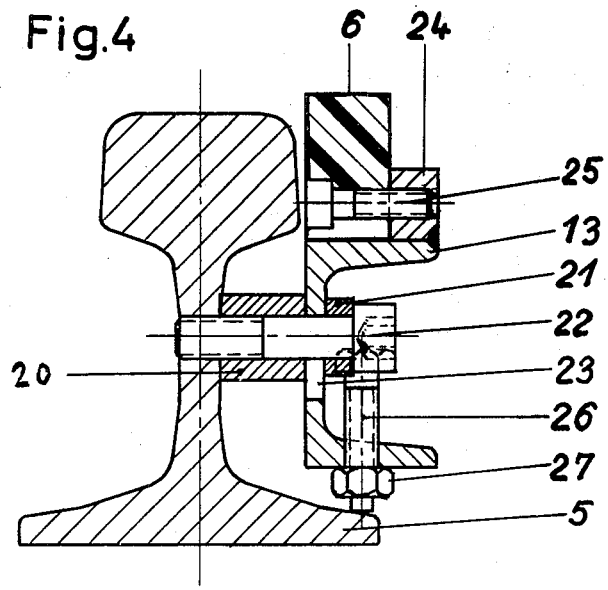
FIG. 4 is a section view along the line III—III in FIG. 3.
Figure 3:
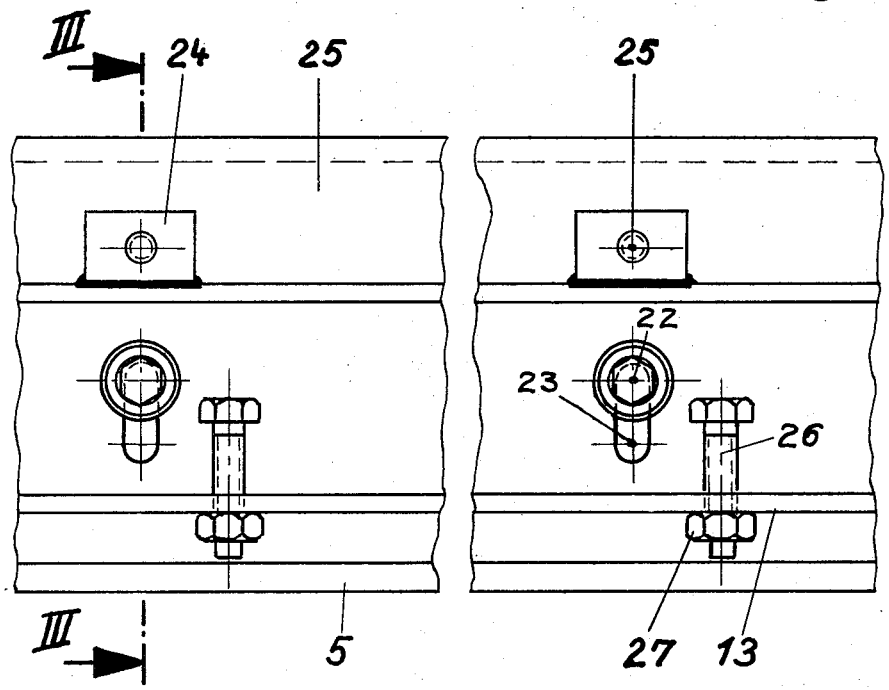
FIG. 3 shows a partial view in the direction of the arrow II in FIG. 2 without a sectional steel member.

Referring to FIGS. 3 and 4, the supporting upright posts, the drag carriages, and the supported steel sectional members are not shown for simplicity's sake. The U-channel member 13 is secured to the railroad rail 5 by means of threaded bolts 22 whereby spacer bushings 20 are placed between the rail facing surface of the land connecting the legs of the U-channel 13 and the web of the rail 5. The land of the U-channel is provided with longitudinal apertures 23 through which the threaded bolts 22 extend whereby the elevational position of the U-channel member may be selected in the range of the longitudinal apertures 23 which are preferably evenly spaced from each other. Small blocks 24 are welded to the upper leg of the U-channel 13 also preferably at equal spacings. According to the invention a bar or strip 6 of synthetic material is secured to these blocks, for example, by screws 25, whereby the bars 6 may be easily removed and replaced if necessary. It will be appreciated that the U-channel and the bar 6 are preassembled prior to the attachment to the rail 5.

The lower leg of the U-channel 13 is provided with threaded holes preferably also equally spaced. Further, adjustment threaded bolts 26 extend through these holes and are long enough so as to rest with their lower ends on the footing of the rail 5. The bolts 26 are secured in position by counter-nuts 27 whereby the elevational position of the U-channel member 13 may be easily adjusted and corrected for placing the top surface of the bar 6 at the desired proper elevational level. Simultaneously, the bolts 26 take up the load of the sectional members to be transported and transmit such load to the footing of the rail 5.

It would be possible to secure the strips of synthetic material directly to the top surface of the rails 5, for example, by means of screws. However, such an arrangement is not quite desirable, because there is no possibility of adjustment and the counter sink holes for the screw heads reduce the effective surface area of such synthetic material strips by the area of the screw head, whereby an especially hard wear and tear takes place in the range of the screws which wear and tear is more effective than in the areas not interrupted by screws. This results in a wavy top surface of the transport rail, whereby the transport is impeded.

Although the invention has been described with reference to specific example embodiments, it is to be understood, that it is intended to cover all modifications and equivalents within the scope of the appended claims.

What is claimed is:

1. A cross transport rail system for a conveyor apparatus, comprising longitudinally extending rail means providing a top surface, support means for said rail means, means for connecting said rail means to said support means, longitudinally extending bar means of synthetic material extending parallel to said rail means, attachment means for attaching said synthetic material bar means to said rail means to extend along one side thereof in such a position that said bar means extend above said top surface of the rail means, and means for adjusting the position of the top surface of said bar means with respect to the top surface of said rail means, wherein said attachment means for said synthetic material bar means comprise U-channel means, first means for securing said U-channel means to said rail means, and further means for securing said synthetic material bar means to said U-channel means, wherein said U-channel means comprise longitudinal apertures, said first securing means extending through said longitudinal apertures for adjusting and fixing the position of said U-channel means, said apertures extending in such a manner that the U-channel means are adjustable sufficiently in their elevational position relative to the respective rail means, that said synthetic material bar means extend above the rail means.

2. The cross transport rail system according to claim 1, wherein said rail means comprise a plurality of rails arranged to extend substantially in parallel to each other, each of said plurality of rails having attached thereto said synthetic material bar means.

3. The cross transport rail system according to claim 1, wherein said synthetic material bar means extend for about 5 millimeters above said top surface of said rail means.

4. The cross transport rail system according to claim 1, wherein said longitudinal apertures extend substantially vertically and at evenly spaced intervals in said U-channel means.

5. The cross transport rail system according to claim 1, wherein said first securing means comprise threaded bolts, means for connecting said bolts to said rail means, said connecting means including spacer bushings between said rail means and said U-channel means, said threaded bolts extending through said spacer bushings.

6. The cross transport rail system according to claim 1, further comprising threaded holes in one leg of said U-channel means, threaded bolts extending vertically through said threaded holes for adjusting the elevational position of said U-channel means relative to said rail means in accordance with the wear and tear of the synthetic material bar means, and counter nut means on said threaded bolt means for fixing the adjusted elevational position of said U-channel means, said threaded bolt means resting with their lower ends on said rail means.

7. The cross transport rail system according to claim 11, wherein said further securing means comprise blocks fixed to said U-channel means, said blocks having screw holes therein and screw means extending into said screw holes for releasably connecting said synthetic material bar means to said U-channel means whereby the synthetic material bar means are exchangeable.

8. A rail structure, especially for a conveyor apparatus, comprising a main rail member having a top surface, a longitudinal bar of synthetic material, means for securing said synthetic material bar to said main rail member alongside and adjacent to at least one side of said main rail member, said securing means comprising a carrier member for said synthetic material bar, and releasable means for adjustably securing said carrier member to said main rail member whereby said synthetic bar means is adjustable and fixable in its elevational position so that it extends above said top surface of the main rail member, wherein said carrier member comprises a U-channel having an upper leg and a lower leg and a land interconnecting said legs, said land facing said main rail member and said legs extending laterally outwardly from said main rail member, longitudinal substantially vertically extending apertures in said land, first bolt means extending substantially horizontally through said longitudinal apertures, spacer means between said main rail means and said land, said first bolt means extending through said spacer means, means for connecting the first bolt means to said main rail member, threaded holes extending vertically through said lower leg of the U-channel, second threaded bolt means extending through said threaded holes, counter nut means on said second threaded bolts for securing said second bolts in fixed positions, said second bolts having lower ends resting on said main rail member, and means for exchangeably securing said synthetic material bar means to said upper leg of said U-channel.

* * * * *

UNITED STATES PATENT OFFICE
CERTIFICATE OF CORRECTION

Patent No. 3,811,556          Dated May 21, 1974

Inventor(s) Gerhard Kaiser et al

It is certified that error appears in the above-identified patent and that said Letters Patent are hereby corrected as shown below:

Claim 7, line 2 change "11" to --1--

Signed and sealed this 1st day of October 1974.

(SEAL)
Attest:

McCOY M. GIBSON JR.
Attesting Officer

C. MARSHALL DANN
Commissioner of Patents